No. 627,561. Patented June 27, 1899.
D. S. WILLIAMS.
VALVE.
(Application filed Oct. 18, 1898.)
(No Model.)
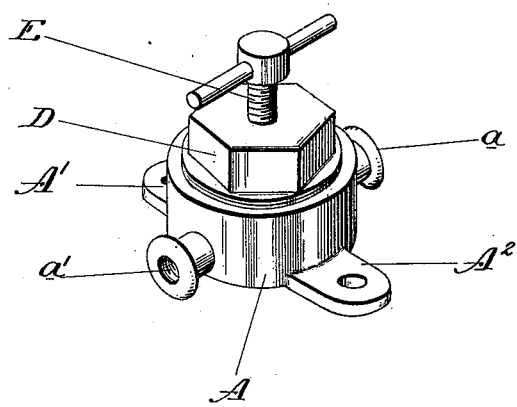
FIG. 1.
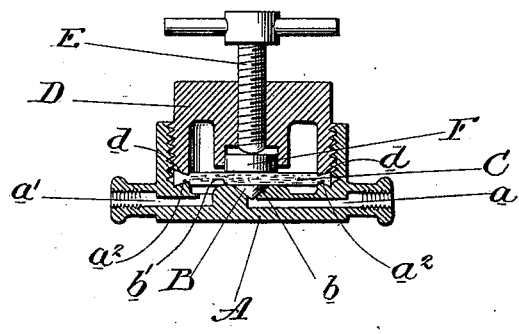
FIG. 2.
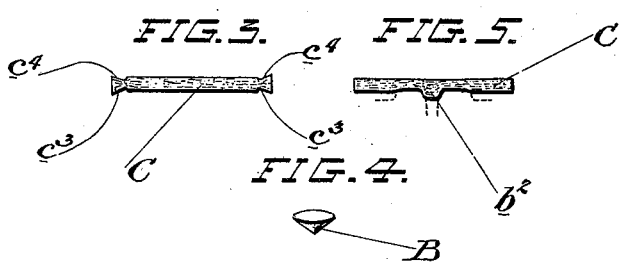
FIG. 3.    FIG. 5.
FIG. 4.
WITNESSES:
INVENTOR

UNITED STATES PATENT OFFICE.

DAVID S. WILLIAMS, OF PHILADELPHIA, PENNSYLVANIA, ASSIGNOR TO HIMSELF AND JOSEPH A. VINCENT, OF SAME PLACE.

VALVE.

SPECIFICATION forming part of Letters Patent No. 627,561, dated June 27, 1899.

Application filed October 18, 1898. Serial No. 693,859. (No model.)

*To all whom it may concern:*

Be it known that I, DAVID S. WILLIAMS, a citizen of the United States of America, and a resident of Philadelphia, in the county of Philadelphia, State of Pennsylvania, have invented certain new and useful Improvements in Valves, of which the following is a specification.

My invention relates to improvements in valves for fluids under high pressure, and is more particularly designed for the use of petroleum-oil-lighting systems in which it is necessary not only to regulate the flow of oil under considerable pressure, but to also completely cut off the supply at times when the lamps are not in use, and a further object is to dispense with the use of valves having stuffing-boxes around the valve-stem, which cannot be kept tight when used for this purpose.

I am aware that diaphragm-valves have been in use for a considerable period of time and have been designed for the purpose of dispensing with stuffing-boxes around the stem of the valve; but none with which I am familiar appear to accomplish the result desired and obtained by the present invention.

The chief objections to the use of diaphragm-valves are, first, the tendency of the diaphragm to creep and cup in the center while under pressure, thus detaching the same from the circumferential fastenings and soon producing a leaky valve, and, second, the tendency of the stem when the valve is tightly closed to press the diaphragm into the opening in the seat and produce a teat which soon closes the opening and obstructs the passage of the fluid. These objections I have overcome, first, by compressing in the diaphragm prior to inserting the same into the valve angular grooves, which are adapted to receive corresponding ledges in the valve-fittings, and, second, by the use of a cone in the valve-seat, the top of which is flush with the upper surface of the seat when the valve is closed, thereby furnishing a broad surface to seat the diaphragm. Valves of this type I have had in service for more than a year on pipe-lines carrying petroleum-oil under a pressure of from seventy-five to one hundred and fifty pounds per square inch, which is extremely difficult to hold and which, as far as I am aware, cannot be securely controlled with well-constructed valves of ordinary types, and I have found in practice that valves which were apparently tight with a steam-pressure of one hundred and fifty pounds to the square inch would leak continually with petroleum-oil under a pressure of fifty pounds to the square inch and less.

My invention will be more fully understood by referring to the accompanying drawings, in which—

Figure 1 represents a perspective view of a valve constructed in accordance with my invention. Fig. 2 illustrates a vertical section of the same. Fig. 3 is a detached section of the diaphragm, which is preferably made of compressed vulcanized fiber and having compressed grooves on both sides of the faces, whereby the same is firmly held in position. Fig. 4 illustrates a side elevation of the cone; and Fig. 5 is a view of the valve in section, showing the result produced when the cone is omitted.

A represents the body of the valve, which is formed of metal and provided with an inlet-passage $a$ and an outlet-passage $a'$, the former terminating at the valve-seat and the latter communicating with an annular recess in the bottom of the valve.

B is a loose metal cone, which is adapted to the valve-seat $b$ and is so formed that when seated the top thereof will be flush with the seat $b'$ upon which the diaphragm C rests when the valve is closed, thus forming a broad bearing, preventing the comparatively soft diaphragm from being forced into the central opening and causing after successive closing operations the teat $b^2$, as shown in Fig. 5.

In order to firmly hold the diaphragm C in position and cause the same to tighten the joint between it and the metal fastenings, I form upon the base of the valve an angular ledge $a^2$, which is adapted to a corresponding groove $c^3$ in the diaphragm C, and in like manner upon the screw-plug D is formed an angular ledge $d$, which is adapted to a corresponding groove $c^4$ in the diaphragm.

The valve is operated by means of a stem

E, which is threaded to engage the centrally-threaded portion of the screw-plug D, and between the end of the stem and the diaphragm is a block F, which is guided in an opening in the plug D.

On the body A of the valve are projections A' and A², which serve to fasten the same to any convenient means of support.

Having described my invention, what I claim, and desire to secure by Letters Patent, is—

1. A valve for high-pressure fluids comprising a body portion provided with an inlet and an outlet passage, a diaphragm, a cone adapted to a seat communicating with the inlet-passage, a plug adapted to hold the diaphragm in position, and a stem threaded within said plug and adapted to operate the diaphragm.

2. A valve for high-pressure fluids comprising a body portion provided with an inlet and an outlet passage, a diaphragm provided with circumferential grooves adapted to receive and to be held by corresponding ledges in the valve, a cone adapted to a valve-seat below the diaphragm, a screw-plug for securing the diaphragm in position, and a stem threaded within the plug and adapted to operate the diaphragm.

3. A valve for high-pressure fluids comprising a body portion provided with an inlet and an outlet passage, a diaphragm provided with circumferential grooves, one of which is adapted to a corresponding ledge in the body of the valve and the other adapted to a ledge formed upon a plug which secures the diaphragm in position, a cone adapted to a seat below the diaphragm, the screw-plug, and a valve-stem threaded therein and operating upon the diaphragm.

4. A valve for high-pressure fluids comprising a body portion provided with an inlet and a discharge passage, a diaphragm provided with inclined circumferential grooves adapted to receive and to be held in position by corresponding ledges in the valve, a cone below the diaphragm adapted to a seat communicating with the inlet-passage, a screw-plug for holding the diaphragm in position, an operating-stem threaded within the plug and a block guided within the screw-plug and interposed between the stem and the diaphragm.

5. A valve for high-pressure fluids comprising a body portion provided externally with projecting means of support and with an inlet and a discharge passage, an inclined ledge within the valve adapted to a corresponding inclined groove in the diaphragm, the diaphragm, a screw-plug having an inclined ledge adapted to a corresponding groove in the diaphragm, a cone adapted to a valve-seat below the diaphragm, a block guided within the screw-plug above the diaphragm, and an operating-stem threaded within the plug and adapted to engage said block.

6. A diaphragm-valve comprising a body portion, A, provided with an inlet-passage, $a$, and an outlet-passage, $a'$, a ledge, $a^2$, within said body portion, a diaphragm, C, having a groove adapted to said ledge, a cone, B, seated below the diaphragm, a block, F, guided above the diaphragm, a screw-plug, D, having a ledge, $d$, adapted to a groove in the diaphragm, and a stem, E, threaded within the plug, D, substantially as specified.

Signed by me, at Philadelphia, Pennsylvania, this 13th day of October, 1898.

DAVID S. WILLIAMS.

Witnesses:
W. S. QUIGLEY,
WALTER C. PUSEY.